March 17, 1970     T. O. NUTT, JR     3,501,169

AUTOMOTIVE TOW-BAR

Filed Sept. 13, 1968

INVENTOR
THOMAS O. NUTT, JR.

BY *Larson and Taylor*

ATTORNEYS

United States Patent Office 3,501,169
Patented Mar. 17, 1970

3,501,169
AUTOMOTIVE TOW-BAR
Thomas O. Nutt, Jr., 3536 Queen Anne Drive,
Fairfax, Va. 22030
Filed Sept. 13, 1968, Ser. No. 759,568
Int. Cl. B60d 1/14; B60g 1/16
U.S. Cl. 280—491                        9 Claims

ABSTRACT OF THE DISCLOSURE

A tow-bar comprising a bed portion having a set of inverted U-shaped clamps for engaging the front axle of a towed vehicle and a set of inverted U-shaped channels for engaging the rods of the towed vehicle connecting the front bumper to the vehicle. Vertically pivotable means connect the bed portion to the towing vehicle.

BACKGROUND—FIELD OF THE INVENTION

This invention relates to towing; and in particular it relates to a tow-bar for towing vehicles.

BACKGROUND—DESCRIPTION OF THE PRIOR ART

Numerous tow-bar devices are presently known for towing vehicles. The simple tow-bar device merely grasps a bumper of the vehicle to be towed. However, this simple procedure is not satisfactory for heavy duty or long distance towing operations. First, this procedure would probably result in damage to the bumper of the towed vehicle. Further, this procedure does not provide a sufficiently positive grasp on the towed vehicle to prevent it from swaying from side to side during the towing operation.

In recognition of the above problems, tow-bars intended for heavy duty or longer distance towing operations are normally designed to achieve a more positive grasp on the towing vehicle such as by firmly engaging the frame of the vehicle.

However, some vehicles such as the Volkswagen "beetle" automobile, have no frame which can be grasped for the purpose of holding the vehicle firmly during heavy duty or longer distance towing operations. Thus, there exists a need for a tow-bar apparatus which will grasp a vehicle without a frame such as a Volkswagen "beetle" automobile with a sufficiently positive grasp so that no damage results to the towed vehicle and so that the towed vehicle does not sway from side to side during the towing operation.

SUMMARY OF THE INVENTION

It is a purpose of this invention to provide a new and improved tow-bar apparatus. More specifically, it is a purpose of this invention to provide a tow-bar apparatus for heavy duty and/or long distance towing operations of vehicles which have no frame.

Briefly, the purpose of the present invention is satisfied by providing an arrangement having a first holding means for engaging and holding the front axle of the vehicle and a second holding means for grasping elements of the vehicle associated with the front bumper, whereby the arrangement firmly and positively holds the towed vehicle and prevents the same from swaying from side to side during the towing operation.

According to the present invention there is provided a rigid bed portion having formed thereon a first holding means for engaging the front axle of the towed vehicle and a second holding means for grasping elements of the front bumper construction, which elements extend in the fore and aft direction of the vehicle.

The first holding means may comprise a set of inverted U-shaped clamp members which encircle the front axle. Suitable angle irons or the like may extend upwardly from the bed portion between the legs of the clamp members for receiving the thrust exerted by the front axle against the bed portion in the horizontal plane during the towing operation. The second holding means may comprise a set of inverted U-shaped channel portions for engaging the fore and aft rods which connect the front bumper to the front of the vehicle.

A front frame arrangement is connected to the forward end of the bed portion for pivotable movement about a horizontal axis, this frame including conventional hitching means for connecting the same to the towing vehicle. During the towing operation, this front frame will normally lie in a plane sloped slightly upwardly relative to the ground surface. However, according to a feature of the invention there is provided an arrangement for holding this front frame in a vertical position.

Thus, it is an object of this invention to provide a new and improved tow-bar.

It is another object of this invention to provide a new and improved tow-bar apparatus for heavy duty and/or long distance towing of non-frame vehicles such as, for example, the Volkswagen "beetle" automobile.

It is another object of this invention to provide a new and improved tow-bar apparatus having a first holding means for holding the front axle of the vehicle and a second holding means for grasping front bumper elements of the vehicle, whereby the vehicle is firmly held, and damage to or swaying of the towed vehicle is avoided.

Other objects of the attendant advantages of the present invention will become apparent from the detailed description to follow, together with the accompanying drawings.

BRIEF DESCRIPTION OF THE DRAWINGS

There follows a detailed description of a preferred embodiment of the present invention to be read together with the accompanying drawings. However, it is to be understood that this preferred embodiment is described and illustrated only for purposes of illustration and that the invention is capable of numerous modifications and variations apparent to those skilled in the art.

DETAILED DESCRIPTION OF THE PREFERRED EMBODIMENT

Figure 1:
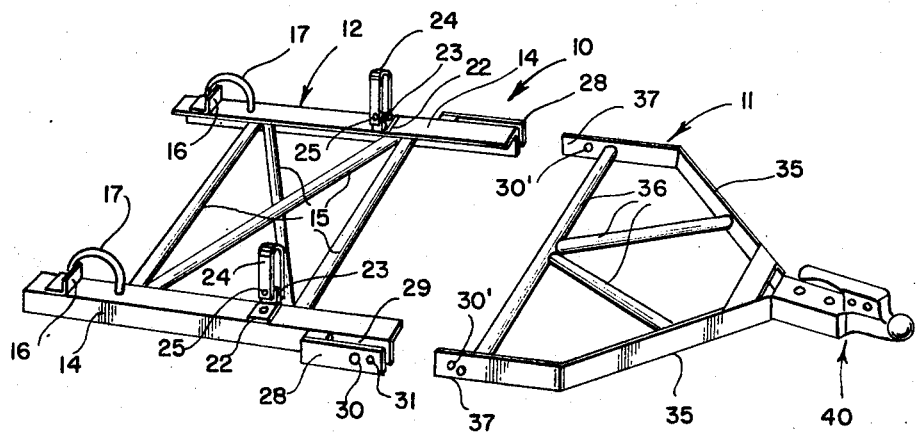
FIGURE 1 is a perspective view of a tow-bar constructed in accordance with the features of the present invention.

Referring now to the figures, wherein like numerals designate like elements throughout, there is shown a tow-bar 10 comprising a front frame 11 and a bed portion 12.

The bed portion 12 comprises a pair of side rails 14 which may be L-shaped channels, the side rails being connected together to form a substantially rigid unit by suitable means such as cross-members 15 which may be connected to the side rails 14 by welding, nuts and bolts, etc.

Figure 2:
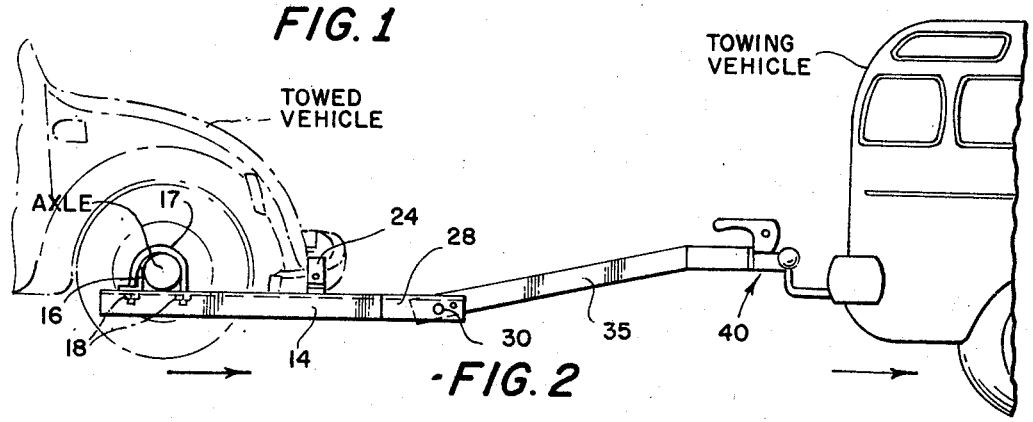
FIGURE 2 is a elevational view showing the tow-bar in use.
Figure 3:
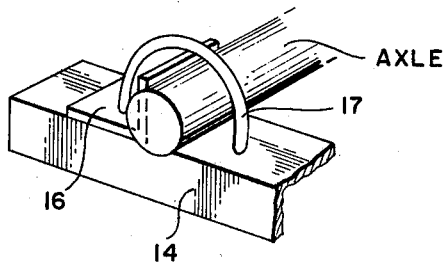
FIG. 3 is a perspective view of a portion of the tow-bar shown in FIGURE 1.

A pair of inverted U-shaped clamp members 17 are connected to the upper surface of the rails 14 by suitable means such as nuts 18 (see FIGURE 2). The purpose of these members 17 is to encircle the front axle of the towed vehicle. See FIGURES 2 and 3. Since the main function of the members 17 is to position the bed 12 vertically relative to the front axle of the towed vehicle, additional means such as angle irons 16 are provided for absorbing thrust in the horizontal direction such as would occur during acceleration of the towing vehicle relative to the towed vehicle. Of course if it is contemplated that considerable thrust would be exerted against the front of the clamp member 17 during deceleration of the towing vehicle relative to the towed vehicle, then angle irons similar to the angle iron 16 may be provided adjacent the front leg of the U-shaped clamp member 17.

A main purpose of the present invention, in addition to firmly holding the towed vehicle, is to prevent sway of the towed vehicle during the towing operation. To assist in achieving this purpose there is provided a second set of holding members mounted on the side rails 14 forward of the clamp members 17. These holding means include inverted U-shaped channel members 24 which are connected to the upright parts 23 of mounting blocks 22 by means of bolts passing through aligned apertures 25 in the members 23 and 24. The mounting blocks are rigidly attached to the side rails 14 by suitable means such as nuts and bolts, welding, or the like. The sides of the U-shaped channel 24 facing the opposite side of the bed portion also includes an aperture 25 aligned with the other two apertures 25. In operation, the two channel members 24 are placed over the bars on the front of the vehicle which connect the front bumper to the front of the vehicle. A long bolt is then passed through all three of the aligned apertures 25 in each channel member so that the said rods are completely encircled.

It will be apparent that the distance between the channel members is fixed for any given vehicle since it must correspond to the distance between the rods on the vehicle connecting the front bumper to the front of the vehicle. However, this same limitation is not true of the clamp member 17. Thus, when utilizing a pair of relatively narrow side rails such as the side rails 14 illustrated herein, the spacing between the side rails will be dependent upon the distance between the said rods on the front of the vehicle. However, it is also within the scope of the invention to use any type of flat surface for the bed portion. In this case the width of the bed portion would not be dependent upon the distance between the holding elements. It is within the purview of this invention to make the bed portion of adjustable width to fit other type automobiles.

For connecting the bed portion to the front frame 11 there is provided a pair of side brackets 28 having apertures 30 located therein and connected to the side rails 14 by any suitable means. A recess 29 is formed between each side bracket 28 and its corresponding rail 14.

The front frame 11 comprises a pair of tapered side rails 35 ending in parallel rear sections 37, the latter including apertures 30'. In practice the sections 37 are placed into the recesses 29 so that apertures 30 and 30' are aligned and adapted to receive a suitable pivot pin or the like (not shown) whereby the front frame pivots about a horizontal transverse axis. The side members 35 and 37 are rigidly connected together by suitable cross members 36. A conventional trailer hitch mechanism 40 is located at the forward end of the front frame 11 for connecting the tow-bar apparatus to the hitch ball of a towing vehicle.

Figure 4:
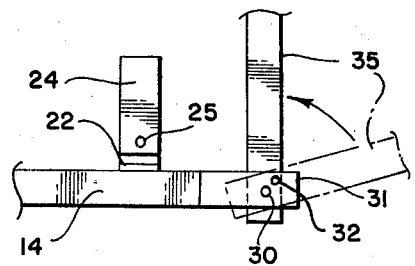
FIGURE 4 is an elevational view of a portion of the tow-bar shown in FIGURE 1.

Side brackets 28 and rear sections 37 also include second apertures 31 through which a pin 32 may be inserted for locking the front section 11 in the vertical position, see FIGURE 4.

In operation, the clamp members 17 engage and hold the front axis of the vehicle while angle irons 16 absorb the thrust between the bed 12 and the axle in the horizontal plane. Meanwhile, the channel members 24 engage the rods extending fore and aft between the front bumper and the front of the towed vehicle. The effect of this combination of holding elements is that the vehicle is held firmly, it does not sway, and no damage will result to any portion of the vehicle.

Although the invention is not limited to any specific set of dimensions, it has been found that a particularly advantageous arrangement is provided by designing the tow-bar so that the elements 14 are 26½ inches long, the elements 28 are 6 inches in length, the channel members 24 extend 3 inches up from the surface of the side rails 14, the overall width of the tow-bar is 24 inches, the elements 35 are 20 inches.

Although the invention has been described in considerable detail with respect to a preferred embodiment thereof, it should be apparent that the invention is capable of numerous modifications and variations apparent to those skilled in the art.

I claim:

1. A tow-bar wherein of the type for towing a vehicle comprising a substantially rigid bed portion having a first holding means formed thereon for encircling and holding the front axle of the vehicle to be towed, and a second holding means formed on the bed portion forward of the first holding means for encircling and holding bars of the vehicle which extend in the fore and aft direction between the front of the vehicle and the front bumper to connect the said front of the vehicle to the said bumper, said second holding means thus preventing the towed vehicle from swaying in the direction, transverse to the fore and aft direction, and means for connecting the bed portion to a towing vehicle, said first holding means comprising at least two clamp members, each clamp member connected at two points to the bed and extending upwardly from one of said connecting points and then downwardly to the second connecting point, the two connecting points of each clamp member being located one behind the other in the said fore and aft direction, each clamp member thus forming with the bed a transversely extending opening for receiving the front axle, and the spaces between the connecting points of the two clamp members being aligned in the said transverse direction, whereby the two clamp members are adapted to hold the front axle of the towed vehicle.

2. A tow-bar as claimed in claim 1 wherein said clamping members are U-shaped bolts held to the bed by nuts located below the bed and including an upright partition extending upwardly from the bed portion between the legs of each U-shaped clamp member, whereby the partition and the top of the bed are adapted to receive the back and the bottom of the said front axle, respectively.

3. A tow-bar as claimed in claim 1 wherein said second holding means comprises at least two inverted U-shaped channel members connected to and extending above the bed portion, the two legs of each channel member located one beside the other in the said transverse direction, such that the space between the legs of each channel member extends in the said fore and aft direction, whereby the channel members are adapted to pass over and hold fore and aft bars on the towed vehicle connecting the front bumper of the towed vehicle to the front of the towed vehicle.

4. A tow-bar as claimed in claim 3 wherein the legs of all the channel members are aligned in the said transverse direction.

5. A tow-bar as claimed in claim 1 wherein the bed portion comprises a pair of parallel side rails extending in the fore and aft direction and rigidly connected together by cross members located therebetween, said first holding means comprising a pair of inverted U-shaped clamp members located one on each side rail and aligned transversely with each other and wherein said second holding means comprises a pair of inverted U-shaped channel members, one located on each side rail forward of the clamp members on that rail, the two channel members aligned transversely.

6. A tow-bar as claimed in claim 5 wherein said means for connecting the bed portion to the towing vehicle comprises a front frame tapered forwardly and pivotally connected at its larger rear end to the forward end of the bed portion for movement about a transverse axis, relative thereto, and including means at its smaller forward end for connecting the front frame to the towing vehicle.

7. A tow-bar as claimed in claim 6 including locking means on the side rails for selectively locking the front frame in a position perpendicular to the bed portion.

8. A tow-bar as claimed in claim 5 wherein the legs of the clamp members are located one behind the other in the fore and aft direction, and the spaces between the legs of the clamp members are aligned in the said transverse direction whereby the clamp members are adapted to pass over and hold the front axle of the vehicle, and wherein the legs of each channel member are located one beside the other in the transverse direction, such that the space between the legs of each channel member extends in the fore and aft direction, whereby the channel members are adapted to pass over and hold the fore and aft bars on a towed vehicle connecting the front bumper to the front of the car.

9. A tow-bar as claimed in claim 8 wherein said clamp members are U-shaped bolts held to the bed by nuts located below the bed and including an upright partition extending upwardly from the bed portion between the legs of each U-shaped clamp member, whereby the partition and the top of the bed are adapted to receive the back and the bottom of the said front axle, respectively.

References Cited

UNITED STATES PATENTS

| | | | |
|---|---|---|---|
| 1,860,518 | 5/1932 | Wells | 280—503 X |
| 1,864,781 | 6/1932 | Wells | 280—402 |
| 2,555,663 | 6/1951 | Schouboe | 214—86 |
| 2,918,310 | 12/1959 | Carson | 280—478 |
| 3,154,204 | 10/1964 | La Venture | 280—402 X |
| 3,281,162 | 10/1966 | Carson | 280—478 |
| 3,410,579 | 11/1968 | Jenson | 280—491 |

LEO FRIAGLIA, Primary Examiner

U.S. Cl. X.R.

280—491